(12) United States Patent
Kim et al.

(10) Patent No.: US 6,927,807 B2
(45) Date of Patent: Aug. 9, 2005

(54) LIQUID CRYSTAL DISPLAY DEVICE

(75) Inventors: Woong Kwon Kim, Gyeonggi-Do (KR); Youn Gyoung Chang, Gyeonggi-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/603,662

(22) Filed: Jun. 26, 2003

(65) Prior Publication Data

US 2004/0036815 A1 Feb. 26, 2004

(30) Foreign Application Priority Data

Aug. 22, 2002 (KR) ................................ 10-2002-0049859

(51) Int. Cl.$^7$ ........................................... G02F 1/1343
(52) U.S. Cl. ...................................... 349/38; 349/139
(58) Field of Search .......................... 349/38, 139, 43, 349/143

(56) References Cited

U.S. PATENT DOCUMENTS

| | | | | |
|---|---|---|---|---|
| 5,659,375 A | * | 8/1997 | Yamashita et al. ............ 349/38 |
| 5,852,488 A | * | 12/1998 | Takemura .................... 349/187 |
| 6,219,118 B1 | * | 4/2001 | Zhang ......................... 349/110 |
| 6,326,641 B1 | * | 12/2001 | Choi ............................ 257/57 |
| 6,559,904 B1 | * | 5/2003 | Kwak et al. ................... 349/43 |
| 6,633,360 B2 | * | 10/2003 | Okada et al. ................ 349/145 |
| 6,654,090 B1 | * | 11/2003 | Kim et al. ................... 349/129 |
| 6,771,345 B2 | * | 8/2004 | Liu et al. .................... 349/146 |

* cited by examiner

*Primary Examiner*—Dung T. Nguyen
(74) *Attorney, Agent, or Firm*—Morgan, Lewis & Bockius LLP

(57) ABSTRACT

A liquid crystal display device includes a plurality of gate lines and data lines arranged horizontally and vertically, respectively, for defining a plurality of pixel areas; a plurality of switching devices formed at intersections of the gate lines and the data lines; and a pixel electrode formed in a pixel area connected to the switching device corresponding to the pixel area and partially overlapping the data lines adjacent to the corresponding pixel area, wherein a first parasitic capacitance generated by the pixel electrode overlapping a data line for the corresponding pixel area and a second parasitic capacitance generated the pixel electrode overlapping a data line for an adjacent pixel area are substantially equal to each other.

14 Claims, 8 Drawing Sheets

LIQUID CRYSTAL DISPLAY DEVICE

This application claims the benefit of Korean Application No. 2002-49859 filed in Korea on Aug. 22, 2002, which is hereby incorporated by reference.

BACKGROUND OF THE INVENTION

1. Field of the Invention

The present invention relates to a liquid crystal display device, and more particularly, to a liquid crystal display device with improved picture quality and increased aperture ratio.

2. Description of the Background Art

As the information society develops, displays becomes more important as more information is transmitted via visual media. In order for a display to be of practical use, a display has to have low power consumption and high picture quality while being both thin and light. A liquid crystal display (LCD) not only meets these conditions but also can be mass produced such that new products having a liquid crystal display device can be manufactured rapidly. Thus, the liquid crystal display device is gradually taking the place of the conventional cathode ray tube (CRT) in the visual component industry.

The liquid crystal display device displays an image by using an optical anisotropy of a liquid crystal. Typically, an active matrix (AM) method of driving the display device by an active device, such as a thin film transistor (TFT), is commonly used to control the optical anisotropy of the liquid crystal. More particularly, the liquid crystal display device comprises an upper substrate including a color filter for displaying colors and a black matrix for shielding light, a lower substrate including a pixel area and a thin film transistor used a the active switching device, and the liquid crystal positioned between the upper substrate and the lower substrate.

FIG. 1 is a plan view of a related art liquid crystal display device, which shows an array of pixels on the lower substrate of the liquid crystal display device. As shown in FIG. 1, each pixel is bounded by a gate line 10 and a data line 15. Each pixel area contains a pixel electrode 20 formed adjacent to where the gate line 10 and the data line 15 intersect each other. At the intersection of the gate line 10 and the data line 15, a thin film transistor 30 is positioned.

The thin film transistor 30 comprises a gate electrode 31 connected to the gate line 10, a source electrode 32 connected to the data line 15, a drain electrode 33 connected to the pixel electrode 20. In addition, the thin film transistor includes a gate insulating layer (not shown) for insulating the gate electrode 31 and the source/drain electrodes 32 and 33, and a semiconductor layer 34. A conductive channel is formed in the semiconductor layer 34 between the source electrode 32 and the drain electrode 33 when a gate voltage is supplied to the gate electrode 31.

As shown in FIG. 1, a storage capacitor electrode 40 for maintaining a pixel voltage is arranged in parallel to the gate line 10 in each pixel area. In general, the pixel electrode 20 of the lower substrate, the liquid crystal (not shown), and the common electrode (not shown) of the upper substrate constitutes a liquid crystal capacitor. However, a voltage applied to the liquid crystal capacitor can not be maintained until a next signal is applied because of leakage in the liquid crystal capacitor. Accordingly, in order to maintain the applied voltage on the liquid crystal capacitor, a storage capacitor has to be used with the liquid crystal capacitor to maintain the applied voltage on the liquid crystal capacitor. The storage capacitor not only maintains a signal voltage but also stabilizes gray scale as well as reduces flicker and after-image effect.

There are two methods of forming a storage capacitor. One method is to form the storage capacitor electrode in addition to the other electrodes and then connect the storage electrode to the common electrode. The other method is to use a part of the $n-1^{th}$ gate line as the storage capacitor electrode of the $n^{th}$ pixel area. The former method is called storage on common method or an independent storage capacitor method, and the latter method is called storage on gate method or storage on previous gate method.

The thin film transistor 30, the data line 15, and the storage capacitor electrode 40 shown in FIG. 1 are formed of opaque metal materials that lower an aperture ratio of the pixel area at the time light is transmitted from a back light (not shown) through the lower substrate. The pixel electrode is formed of a transparent conductive material, such as Indium Tin Oxide. To improve the aperture ratio, the pixel electrode is extended over the adjacent data lines 15 and the portion of a black matrix that would be overlapping the pixel electrode along the data line is removed.

FIG. 2 is a plan view showing a part of the liquid crystal display device having a high aperture ratio in accordance with the related art, as discussed above. As shown in FIG. 2, the $n^{th}$ data line 15n and the $n+1^{th}$ data line 15n+1 are located in a row direction, and the gate line 10 is formed in a column direction. A part of the $n+1^{th}$ data line protrudes to form the source electrode 32 of the thin film transistor 30. Also, in the liquid crystal display device having a high aperture ratio, the data lines 15n and 15n+1 are overlapped with a part of the pixel electrode 21 in order to improve the aperture ratio. The cross-hatched areas of S1 and S2 in FIG. 2 denote overlap areas between the data lines 15n/15n+1 and the pixel electrode 21. Because the pixel electrode 21 covers the entire pixel area bounded by the data lines 15n/15n+1, the aperture ratio is increased.

In the related art liquid crystal display device having a high aperture ratio, the data lines 15n and 15n+1 are overlapped with the pixel electrode 21, a thus a parasitic capacitance $C_{dp}$ is generated between the data lines 15n/15n+1 and the pixel electrode 21. Also, as shown in FIG. 2, the pixel electrode 21 is not formed on the switching device 30, so that an area S1 in which the pixel electrode 21 is overlapped with the $n^{th}$ data line 15n is not equal to an area S2 in which the pixel electrode 21 is overlapped with the $n+1^{th}$ data line 15n+1. Accordingly, a difference is generated between the parasitic capacitances of the right and left sides of the pixel electrode. Such a difference deteriorates the picture quality of the liquid crystal display device. That is, even if the pixel electrode 21 is extended over the data lines 15n and 15n+1 to improve the aperture ratio, a light leakage phenomenon occurs at an edge of the pixel area at the time the pixel is switched from "on" to "off" due to the difference of the parasitic capacitances on the sides of the pixel electrode.

SUMMARY OF THE INVENTION

Accordingly, the present invention is directed to a fabrication method of an LCD device that substantially obviates one or more of the problems due to limitations and disadvantages of the related art.

An object of the present invention is to provide a liquid crystal display device which prevents deterioration of picture quality generated at the time a pixel is switched from "on" to "off".

Another object of the present invention is to provide a liquid crystal display device having parasitic capacitances on the right and left sides of the pixel electrode to be substantially equivalent.

To achieve these and other advantages and in accordance with the purpose of the present invention, as embodied and broadly described herein, there is provided a liquid crystal display device including a plurality of gate lines and data lines arranged horizontally and vertically, respectively, for defining a plurality of pixel areas; a plurality of switching devices formed at intersections of the gate lines and the data lines; and a pixel electrode formed in a pixel area connected to the switching device corresponding to the pixel area and partially overlapping the data lines adjacent to the corresponding pixel area, wherein a first parasitic capacitance generated by the pixel electrode overlapping a data line for the corresponding pixel area and a second parasitic capacitance generated the pixel electrode overlapping a data line for an adjacent pixel area are substantially equal to each other.

In another aspect, a liquid crystal display device includes a plurality of gate lines and data lines arranged horizontally and vertically defining a plurality of pixel areas; a plurality of switching devices formed at intersections of the gate lines and the data lines; and a pixel electrode formed in a pixel area connected to the switching device corresponding the pixel area, each pixel electrode having a portion with a taper shape overlapping a data line of an adjacent pixel area, wherein a portion of the data line for the corresponding pixel area protrudes into the corresponding pixel area such that a first parasitic capacitance generated by the pixel electrode overlapping a data line of the corresponding pixel area and a second parasitic capacitance generated by the pixel electrode overlapping the data line for the adjacent pixel area are substantially equal to each other.

In another aspect, a liquid crystal display device includes a plurality of gate lines and data lines arranged horizontally and vertically, respectively, for defining a plurality of pixel areas; a plurality of switching devices formed at intersections of the gate lines and the data lines; and a pixel electrode formed in a pixel area connected to a switching device corresponding to the pixel area and partially overlapping the data lines adjacent to the corresponding pixel area, wherein a first area of a data line for the corresponding pixel area overlapped with the pixel electrode and a second area of a data line for an adjacent pixel area overlapped with the pixel electrode are substantially equal to each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
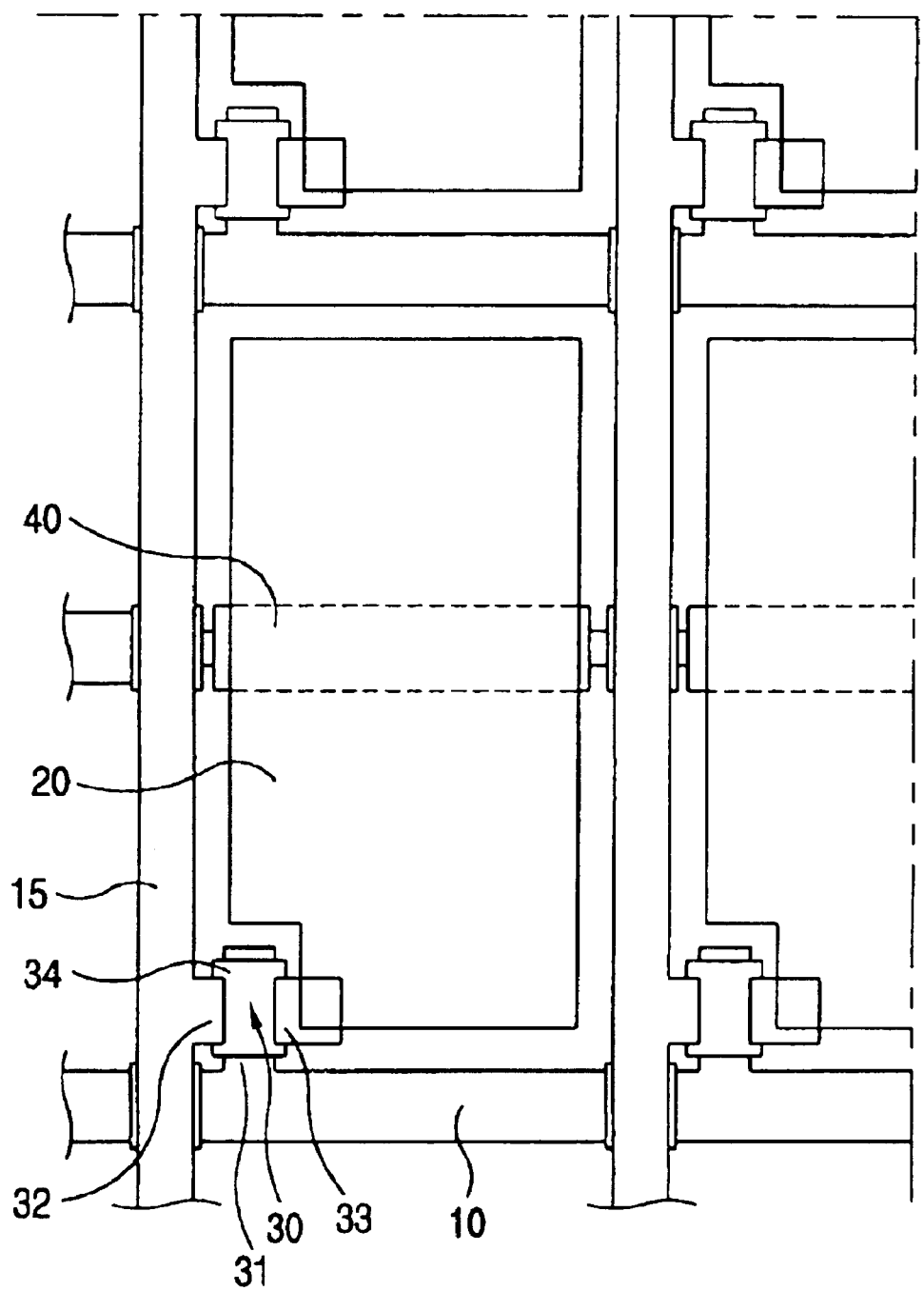
FIG. 1 is a plan view of a related art liquid crystal display device, which shows an array of pixels on the lower substrate of the related art liquid crystal display device.
Figure 2:
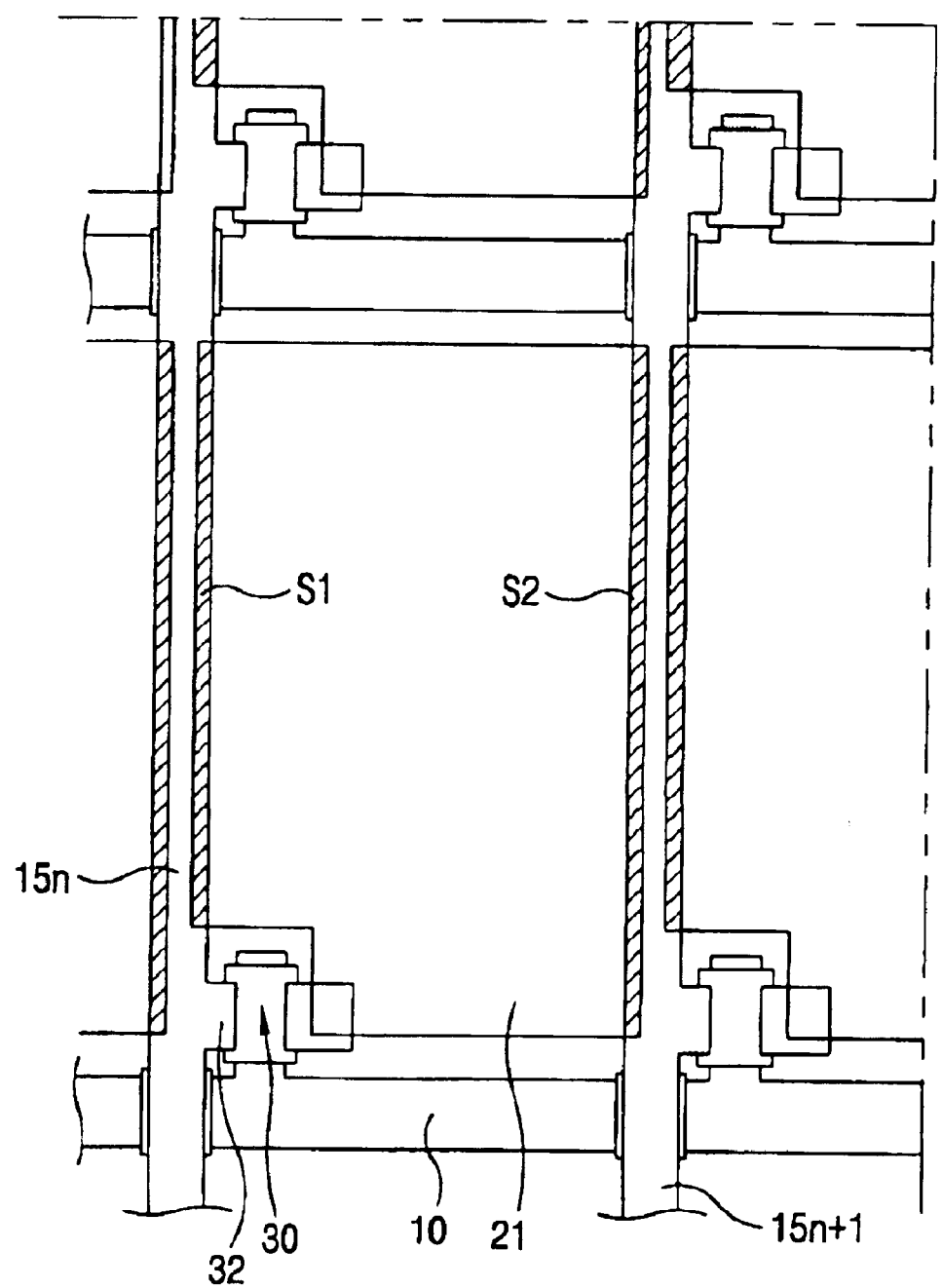
FIG. 2 is a plan view showing a part of the liquid crystal display device having a high aperture ratio in accordance with the related art.

Reference will now be made in detail to the preferred embodiments of the present invention, examples of which are illustrated in the accompanying drawings.

The present invention provides a liquid crystal display device of a high aperture ratio that prevents picture quality deterioration by making parasitic capacitances generated at right and left sides of a pixel electrode to be substantially equal to each other. To make the parasitic capacitances generated at right and left sides of the pixel electrode to be substantially equal to each other such that light leakage does not occur, the structures of a data line and/or a pixel electrode are altered by protruding the data line into a pixel area or by configuring the pixel electrode to protrude over a portion of the data line.

The parasitic capacitance formed between a data line and a pixel electrode is determined by a following equation 1.

$$C_{dp} = \epsilon A / d \qquad \text{[equation 1]}$$

In equation 1, $C_{dp}$ denotes a parasitic capacitance between the data line and the pixel electrode, A denotes an area of an overlap between the pixel electrode and a data line, and d denotes thickness of the dielectric, that is, a distance between the overlapped data line and pixel electrode between which the dielectric is positioned. The dielectric between the data line and the pixel electrode is an insulator in which electric current does not flow and has an intrinsic permittivity $\epsilon$.

The liquid crystal display device according to the present invention prevents a picture quality deterioration due to the parasitic capacitance difference by configuring areas where the pixel electrode overlaps with the data lines located at right and left sides of the pixel area to be substantially equal to each other. The pattern of the data line and/or pixel electrode can be configured to make the areas of the pixel electrode on both sides of the pixel that overlap the data lines to be substantially equal. Hereinafter, exemplary embodiments of the liquid crystal display device according to the present invention will be explained with reference to FIGS. 3 through 6. Throughout the explanations of the exemplary embodiments, the $n^{th}$ data line will be defined as a data line of a corresponding pixel area, and the $n+1^{th}$ data line will be defined as a data line of an adjacent pixel area.

FIGS. 3 through 6 are exemplary embodiments of the liquid crystal display device according to the present invention, in which an array substrate corresponding to a lower substrate of a liquid crystal display device is shown. In each of the respective FIGS. 3 through 6, the array substrate comprises: a plurality of gate lines 110, 210, 310, and 410 and data lines 115, 215, 315, and 415 arranged horizontally and vertically to define a pixel area; a plurality of switching devices, such as thin film transistors 130, 230, 330, and 430 formed at intersections of the gate lines and the data lines; and pixel electrodes 120, 220, 320, and 420 formed to be partially overlapped with the data lines 115, 215, 315, and 415.

Each of the thin film transistors, such as 130, 230, 330 and 430 includes a gate electrode formed of a protrusion from a gate line, such as gate lines 110, 210, 310 and 410. An insulating layer (not shown) is deposited over the gate electrode on the lower substrate. Then, a semiconductor layer (not shown) is formed on the insulating layer. Subsequently, source/drain electrodes are formed on the semiconductor layer and a passivation layer is deposited over the source/drain electrodes and the semiconductor layer.

In each of the exemplary embodiments, overlapped areas of the data lines and the pixel electrodes before structures of the data lines and the pixel electrodes are configured are referred to as areas S1 or S2, and overlapped areas of the data lines and the pixel electrodes after structures of the data lines and/or the pixel electrodes are configured are referred to as areas S1' or S2'. Areas S1 and S1' are overlapped areas of the $n^{th}$ data line and the pixel electrode. Areas S2 and S2' are overlapped areas of the $n+1^{th}$ data line and the pixel electrode. To address electric field affects in a liquid crystal arrangement at an edge of the pixel area when the pixel electrode overlaps the data lines, a width d1 in which the pixel electrode overlaps the nth data line can have a different width than a width d2 in which the pixel electrode is overlaps the $n+1^{th}$ data line. Therefore, the area S1 can be larger than the area S2 or contrary to this, the area S2 can be larger than the area S1.

Figure 3A:
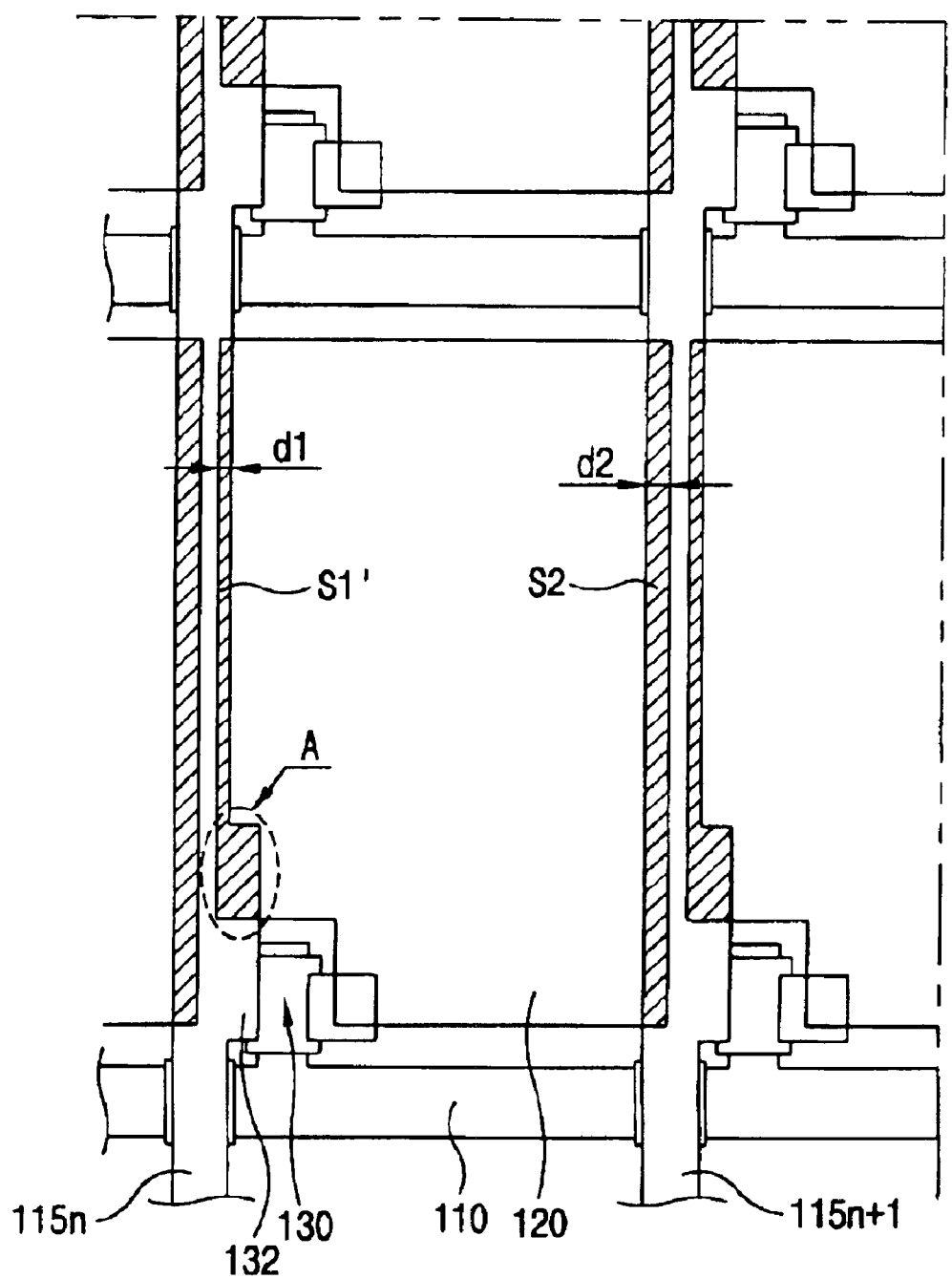
FIGS. 3A and 3B are plan views showing a pixel of a liquid crystal display device according to a first embodiment of the present invention.
Figure 3B:
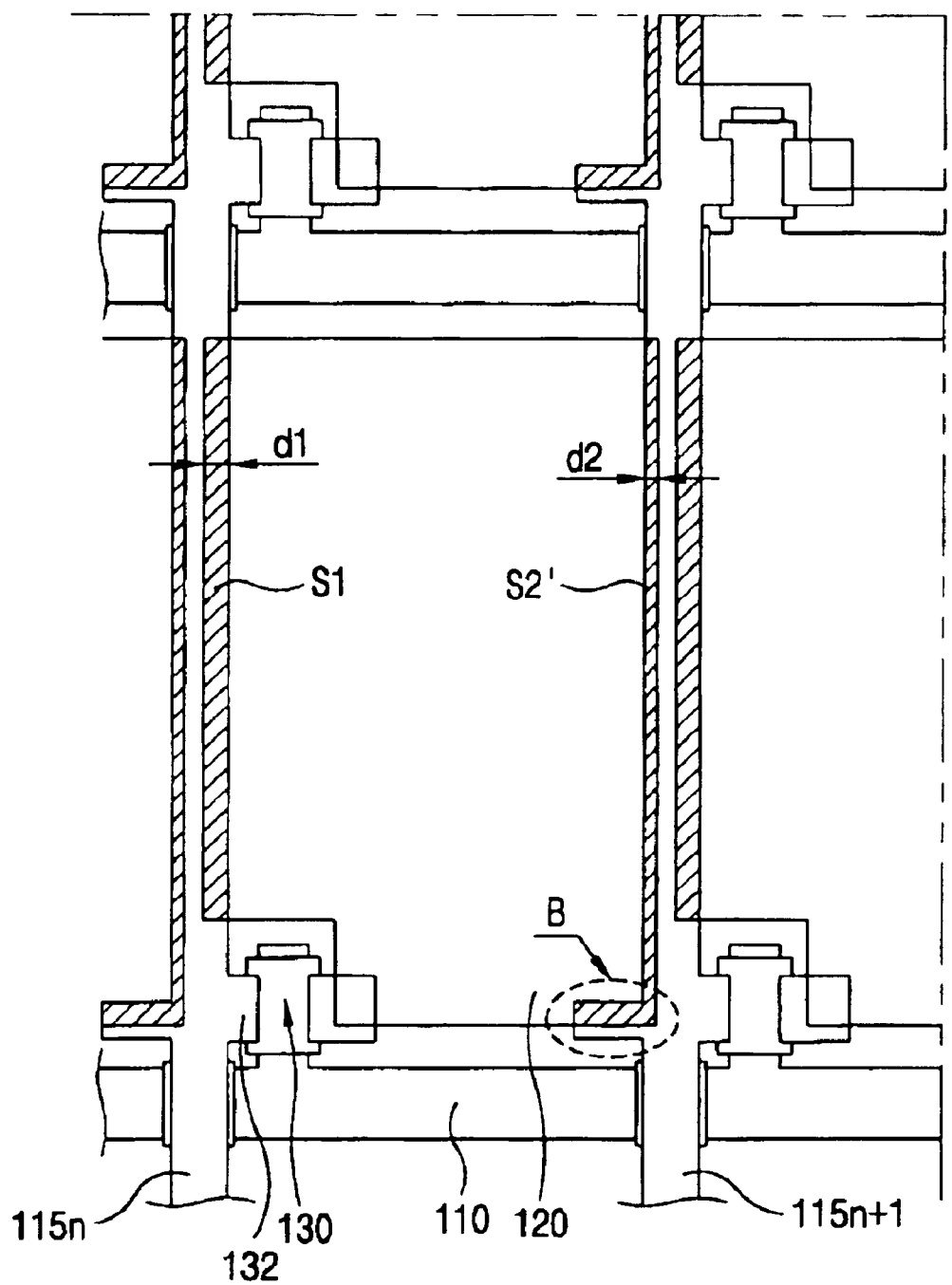

FIGS. 3A and 3B are plan views showing a pixel of a liquid crystal display device according to a first embodiment of the present invention. FIG. 3A shows a pattern of data lines 115n and 115n+1 in a case where area S1 would have been smaller than area S2 since width d1 is less than the width d2. As shown in FIG. 3A, a source electrode 132 of a thin film transistor 130 of the corresponding pixel area is formed in the data line 115n for the corresponding pixel area to protrude into the corresponding pixel area, thereby creating an increasing overlapped area S1'. The increase is caused by the protrusion of the nth data line 115n under the pixel electrode 120 of the corresponding pixel area. The region A in FIG. 3A denotes the increase of the overlapped area S1' such that area S1' is substantially equivalent to the area S2.

FIG. 3B shows a pattern of the data lines 115n and 115n+1 for a corresponding pixel area in a case where the area S1 would have been larger than the area S2 since the width d1 is greater than the width d2. In FIG. 3B, the data line 115n+1 for the adjacent pixel area is patterned to protrude into the corresponding pixel area as an oblique line, thereby increasing an overlapped area S2' to be substantially equal to the area S1. The region B in FIG. 3b denotes an increased overlapped area.

Any pattern of the data lines 115n and 115n+1 is possible to create overlapped areas between the data lines and the pixel electrode 120 that are substantially the same. Typically, a width of a data line used in the liquid crystal display device is designed to be a minimum width such that a high aperture ratio can be achieved. However, in the embodiment shown in FIGS. 3A and 3B, the data lines 115n and 115n+1 protruding into a pixel area to increase the overlapped areas lowers the aperture ratio. To prevent the aperture ratio from being lowered the pattern of the pixel electrode can reconfigured instead of the data lines.

Figure 4A:
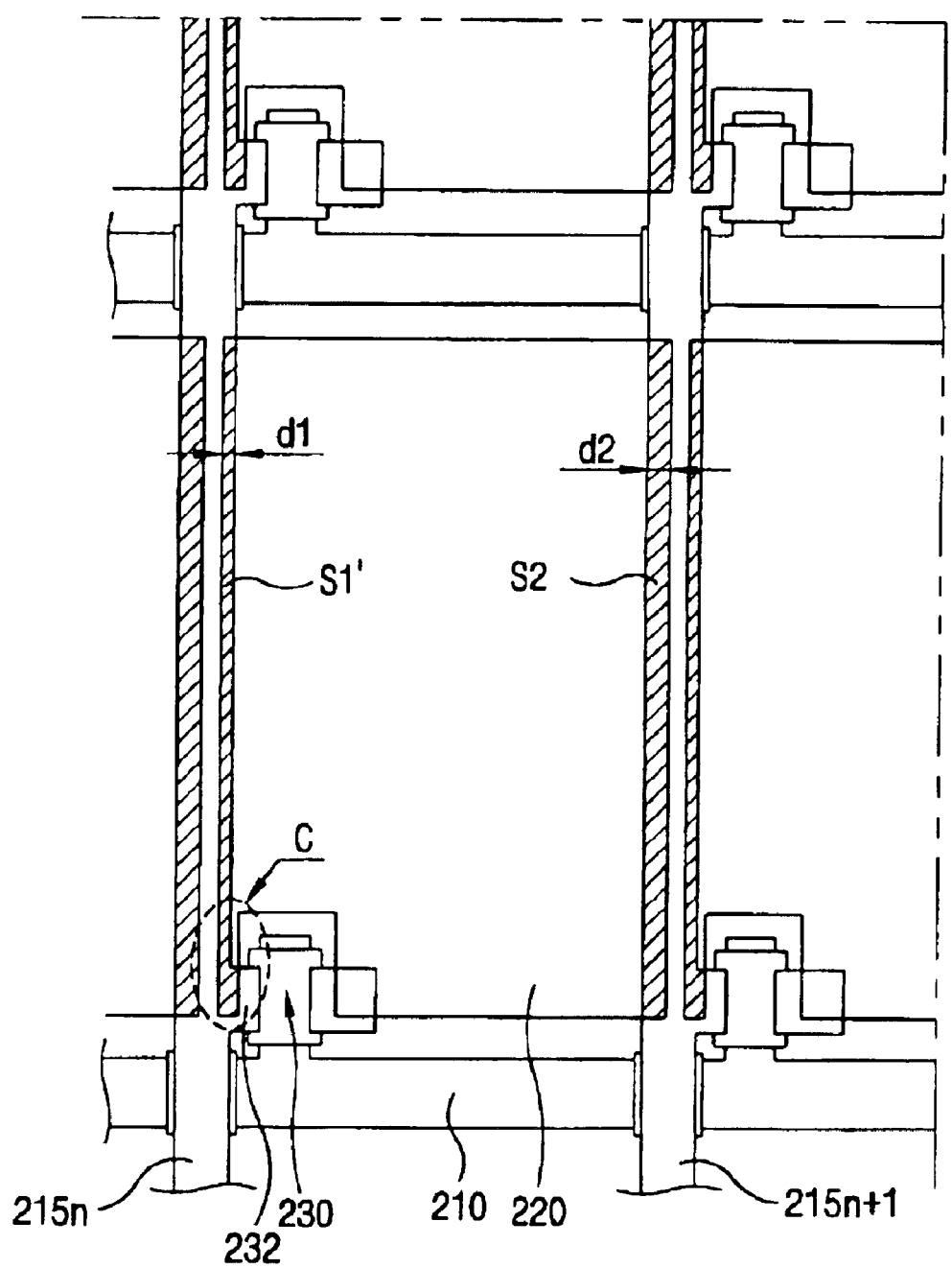
FIGS. 4A and 4B are plan views showing a pixel of a liquid crystal display device according to a second embodiment of the present invention.
Figure 4B:
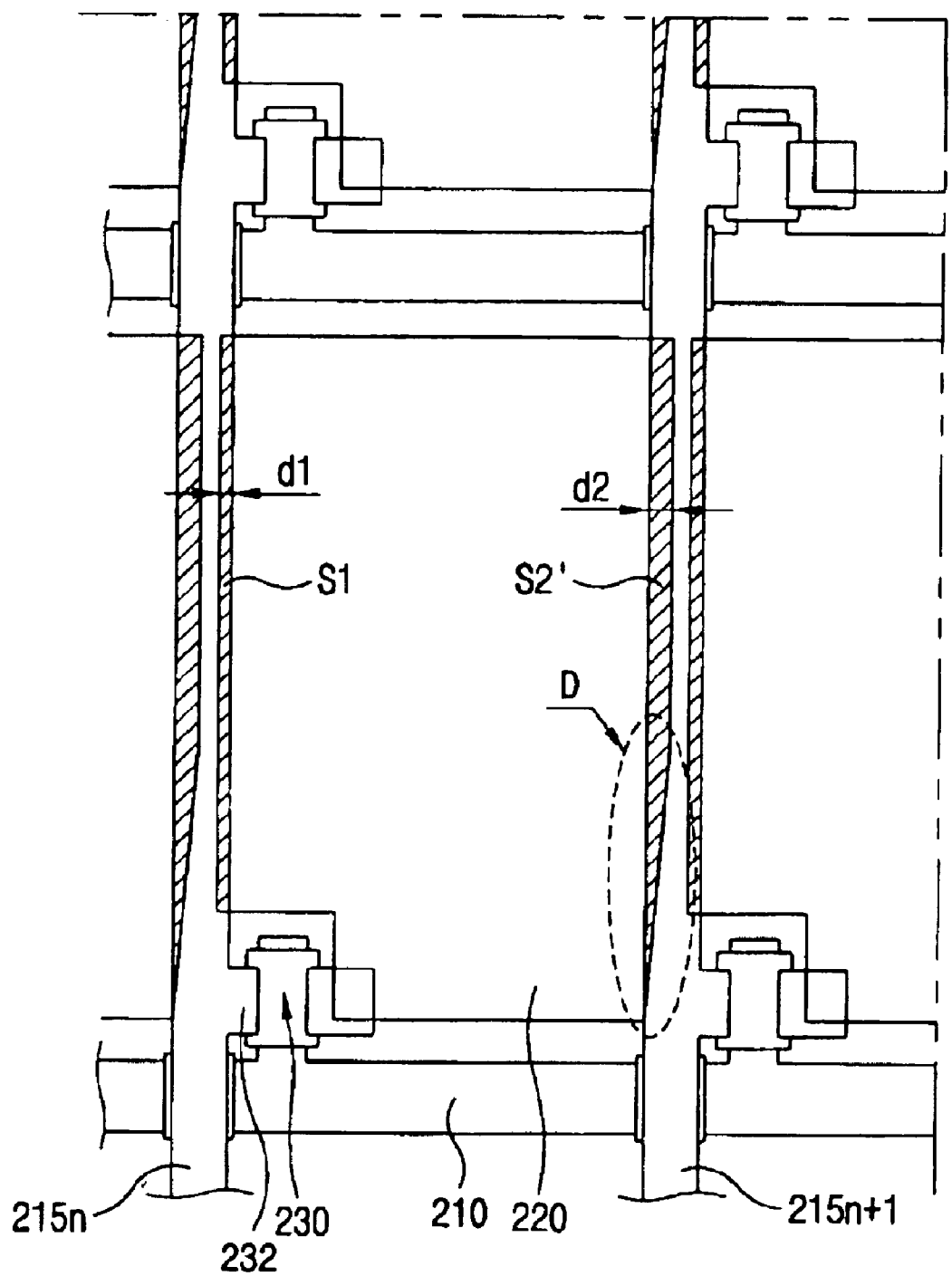

FIGS. 4A and 4B are plan views showing a pixel of a liquid crystal display device according to a second embodiment of the present invention. FIG. 4A shows a pattern of a pixel electrode 220 in a case where area S1 would have been smaller than the area S2 since the width d1 is less than the width d2. As shown in FIG. 4A, the pixel electrode 220 overlapping data line 215n of a corresponding pixel area is configured such that a portion of the pixel electrode 220 protrudes over a portion of a source electrode 232 of a thin film transistor 230 connected to the $n^{th}$ data line 215n such that area of overlap for the pixel electrode 20 is substantially the same for both the 215n and 215n+1 data lines. The region C in FIG. 4A denotes an increased overlapped area by configuring the pixel electrode 220 to protrude over the source electrode 232 of a thin film transistor 230 such that area S1' is substantially equal to area S2.

FIG. 4B shows a pattern of the pixel electrode 220 in a case where the area S1 would have been smaller than the area S2 since the width d1 is less than the width d2. In FIG. 4B, the overlapped area above data line 215n+1 is decreased by patterning the pixel electrode 220 overlapped with a data line 215n+1 of an adjacent pixel area into a taper shape. The region D in FIG. 4B denotes the decreased overlapped area of the pixel electrode 220 over the data line 215n+1 such that area S1 is substantially equal to area S2'.

Although, a part of the pixel electrode 220 was patterned into a taper shape to decrease the overlapped area, any pattern of pixel electrode 220 can be used if the overlapped areas on the right and left sides of the pixel area are substantially equal. Further, if the pixel electrode 220 protrudes over a portion of the source electrode 232 or the pixel electrode 220 overlaps with the data line 215n+1 of the adjacent pixel area with a taper shape, as shown in FIGS. 4A and 4B, the aperture ratio of the liquid crystal display device is increased.

Figure 5:
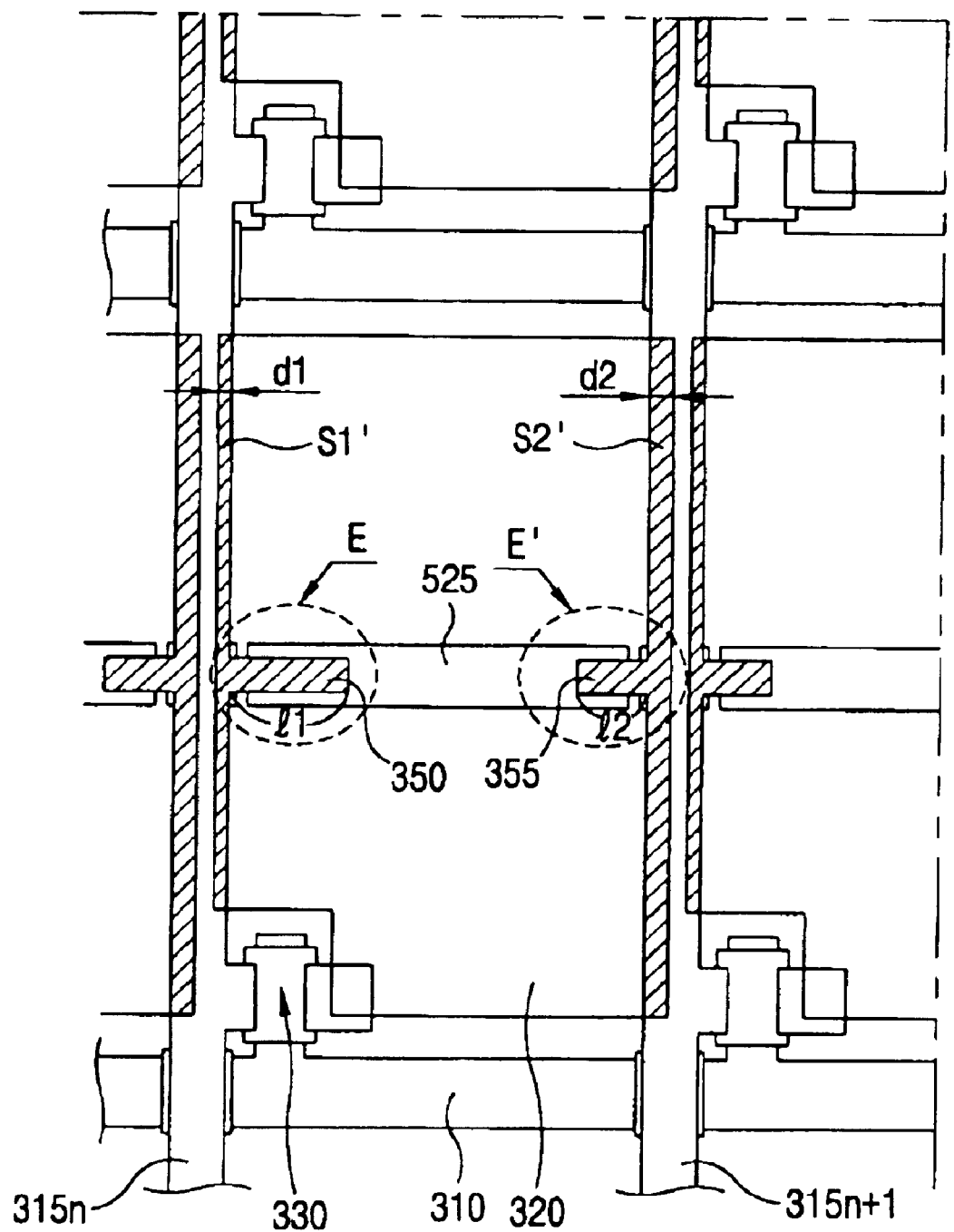
FIG. 5 is a plan view showing a pixel of a liquid crystal display device according to a third embodiment of the present invention.

FIG. 5 is a plan view showing a pixel of the liquid crystal display device including a storage capacitor electrode. As shown in FIG. 5, even if data lines 315n and 315n+1 protrude into the pixel area above the storage capacitor electrode 525, the aperture ratio is not decreased. By protruding the data lines 315n and 315n+1 into the pixel area over the storage capacitor electrode 525 at intersections between the data lines and the storage capacitor electrode 525, the overlapped areas at the right and left sides of the pixel electrode are controlled to be substantially equal to one another. That is, by protruding the right and left data lines 315n and 315n+1 into the pixel area above the storage capacitor electrode 525 and thus varying the area S1 and area S2, a value of the parasitic capacitance for both of the S1 and S2 areas can be adjusted to be substantially equivalent. As shown in FIG. 5, region E denotes the increased overlapped area for the data line 315n of the corresponding pixel area and region E' denotes the increased overlapped area for the data line 315n+1 of the adjacent pixel area. As shown in FIG. 5, since the d1 is less than the d2 and thus the area S1 is smaller than the area S2, an area of a part 350 protrudes into the corresponding pixel area from the $n^{th}$ data line 315n with a length l1 that is larger than an area of a part 355 protruding into the corresponding pixel area from the $n+1^{th}$ data line 315n+1 with a length l2. That is, l1 is longer than l2, so that the overlapped areas of S1' and S2' are substantially equal.

Figure 6:
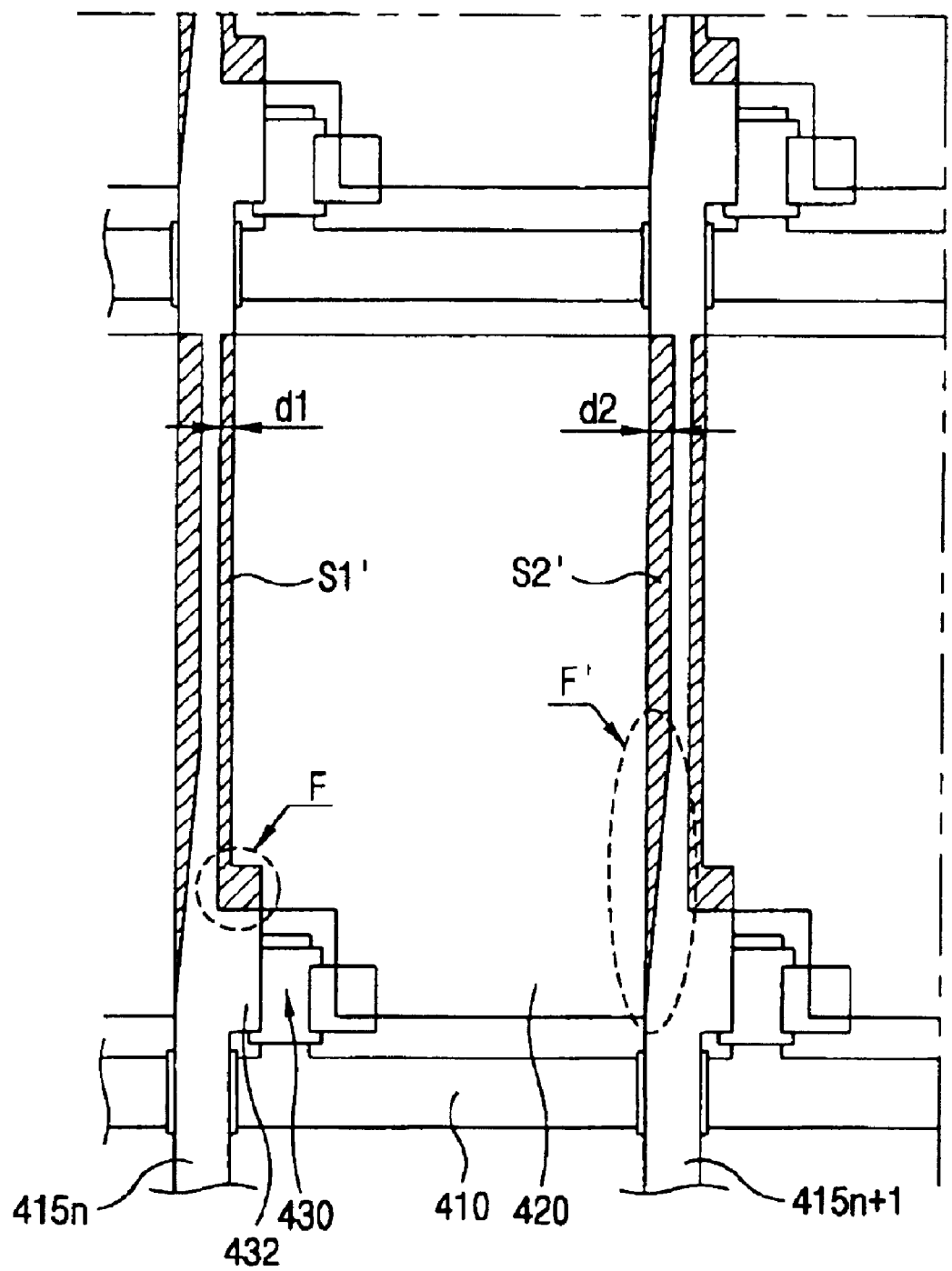
FIG. 6 is a plan view showing a pixel of a liquid crystal display device according to a fourth embodiment of the present invention.

FIG. 6 is a plan view showing a pixel of a liquid crystal display device according to a fourth embodiment of the present invention in which features of the first embodiment and the second embodiments in FIGS. 3 and 4 are combined. Since the width d1 is less than the width d2 in FIG. 6, the area S1 is smaller than the area S2, a source electrode 432 of a data line 415n of a corresponding pixel area protrudes under a pixel electrode 420, thereby increasing area S1' and thus increasing a parasitic capacitance. In addition, the side of the pixel electrode 420 overlapping data line 415n+1 for an adjacent pixel area is patterned to have a taper shape such that the area S2' decreases and the parasitic capacitance associated therewith decreases. Accordingly, the areas S1' and S2' can be configured to be substantially equal and have substantially equal parasitic capacitance. The increase in the area of overlap for the pixel electrode with the data line 415n is denoted as region F in FIG. 6 and the decrease in the area of overlap for the pixel electrode with the data line 415n+1 is denoted as region F'.

In all of the embodiments, the parasitic capacitance difference can be controlled by configuring the areas S1 and S2 if permittivity and thickness of the insulator formed between the data lines and the pixel electrode are substantially fixed. Also, if said embodiments are performed together with one another, the parasitic capacitance of right and left sides of the pixel electrode can be adjusted more flexibly, thereby being able to make the parasitic capacitance on both sides of the pixel electrode to be substantially equal.

As aforementioned, in the present invention, the structures of the data lines and/or the pixel electrode are changed to make the parasitic capacitances of both sides of the pixel be equal, so that light leakage generated at the time of on/off of the switching device is prevented and thus a picture quality can be improved. Also, a structure of the present invention can be formed only by changing the mask without additional processes, so that additional cost is not required. That is, the present invention can be performed only by changing the mask pattern at the time of forming the data lines or the pixel electrode.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A liquid crystal display device comprising:
    a plurality of gate lines and data lines arranged horizontally and vertically, respectively, for defining a plurality of pixel areas;
    a plurality of switching devices formed at intersections of the gate lines and the data lines;
    a pixel electrode formed in a pixel area connected to the switching device corresponding to the pixel area so as to partially overlap the data lines adjacent to the corresponding pixel area and having an opening around the switching device corresponding to the pixel area, wherein a first parasitic capacitance generated by the pixel electrode overlapping a first area of a data line for the corresponding pixel area and a second parasitic capacitance generated by the pixel electrode overlapping a second area of a data line for an adjacent pixel area are substantially equal to each other; and
    a protrusion from one of the data lines having an area overlapped with the pixel electrode that is a portion of one of the first and second areas,
    wherein the first area has a first shape and the second area has a second shape that is different from the first shape.

2. The liquid crystal display device according to claim 1, wherein the switching devices are thin film transistors.

3. The liquid crystal display device according to claims 2, wherein each of the thin film transistors comprises:
    a gate electrode formed of a protrusion from the gate line;
    an insulating layer deposited over an entire substrate on which the gate electrode is formed;
    a semiconductor layer formed on the insulating layer;
    source and drain electrodes formed on the semiconductor layer; and
    a passivation layer deposited over the source and drain electrodes and the semiconductor layer.

4. The liquid crystal display device according to claim 3, wherein the source electrode protrudes into the pixel area and is overlapped by the pixel electrode.

5. The liquid crystal display device according to claim 3, wherein a portion of the pixel electrode protrudes and overlaps a source electrode of a thin film transistor for the corresponding pixel area.

6. The liquid crystal display device according to claim 1, further comprising a storage capacitor electrode crossing the corresponding pixel area in parallel to the gate line, wherein at least one of the data lines adjacent to the corresponding pixel area has a portion protruding under the pixel electrode and over the storage capacitor electrode.

7. A liquid crystal display device comprising:
    a plurality of gate lines and data lines arranged horizontally and vertically defining a plurality of pixel areas;

a plurality of switching devices formed at intersections of the gate lines and the data lines; and a pixel electrode formed in a pixel area connected to the switching device corresponding to the pixel area, each pixel electrode having a first portion with a taper shape overlapping a data line of an adjacent pixel area and a second portion with a rectangular shape overlapping a data line for the corresponding pixel area, wherein a portion of the data line for the corresponding pixel area protrudes into the corresponding pixel area such that a first parasitic capacitance generated by the second portion of the pixel electrode overlapping a data line for the corresponding pixel area and a second parasitic capacitance generated by the first portion of the pixel electrode overlapping the data line for the adjacent pixel area are substantially equal to each other.

8. The liquid crystal display device according to claim 7, wherein the switching devices are thin film transistors.

9. The liquid crystal display device according to claim 8, wherein each of the thin film transistors comprises:

a gate electrode formed of a protrusion from the gate line;

an insulating layer deposited over an entire substrate on which the gate electrode is formed;

a semiconductor layer formed on the insulating layer;

source and drain electrodes formed on the semiconductor layer; and a passivation layer deposited over the source and drain electrodes and the semiconductor layer.

10. The liquid crystal display device according to claim 7, further comprising a storage capacitor electrode crossing the corresponding pixel area in parallel to a gate line, wherein at least one of the data lines adjacent to the corresponding pixel area have a portion protruding under the pixel electrode and over the storage capacitor electrode.

11. A liquid crystal display device comprising:

a plurality of gate lines and data lines arranged horizontally and vertically, respectively, for defining a plurality of pixel areas;

a plurality of switching devices formed at intersections of the gate lines and the data lines;

a pixel electrode formed in a pixel area connected to a switching device corresponding to the pixel area so as to partially overlap the data lines adjacent to the corresponding pixel area and having an opening around the switching device corresponding to the pixel area, wherein a first area of a data line for the corresponding pixel area overlapped with the pixel electrode and a second area of a data line for an adjacent pixel area overlapped with the pixel electrode are substantially equal to each other and have different shapes; and a protrusion from one of the data lines having an area overlapped with the pixel electrode that is a portion of one of the first and second areas.

12. The liquid crystal display device according to claim 11, wherein a source electrode of the switching device protrudes into the pixel area and is overlapped by the pixel electrode.

13. The liquid crystal display device according to claim 11, wherein a portion of the pixel electrode protrudes and overlaps a source electrode of a switching device for the corresponding pixel area.

14. The liquid crystal display device according to claim 11, further comprising a storage capacitor electrode crossing the corresponding pixel area in parallel to a gate line, wherein at least one of the data lines adjacent to the corresponding pixel area have a portion protruding under the pixel electrode and over a storage capacitor electrode.

* * * * *